United States Patent
Vigholm

(10) Patent No.: US 7,464,545 B2
(45) Date of Patent: Dec. 16, 2008

(54) HYDRAULIC SYSTEM AND WORK MACHINE COMPRISING SUCH A SYSTEM

(75) Inventor: Bo Vigholm, Stora Sundby (SE)

(73) Assignee: Volvo Construction Equipment + Holding Sweden AB, Eskilstvna (SE)

( * ) Notice: Subject to any disclaimer, the term of this patent is extended or adjusted under 35 U.S.C. 154(b) by 228 days.

(21) Appl. No.: 11/571,900

(22) PCT Filed: Jun. 22, 2005

(86) PCT No.: PCT/SE2005/000998

§ 371 (c)(1),
(2), (4) Date: Jan. 10, 2007

(87) PCT Pub. No.: WO2006/011836

PCT Pub. Date: Feb. 2, 2006

(65) Prior Publication Data

US 2007/0234718 A1 Oct. 11, 2007

(30) Foreign Application Priority Data

Jul. 28, 2004 (SE) .................................... 0401938

(51) Int. Cl.
*F16D 31/02* (2006.01)
(52) U.S. Cl. ............................ 60/452; 60/422; 60/428
(58) Field of Classification Search .................. 60/421, 60/422, 428, 429, 445, 452
See application file for complete search history.

(56) References Cited

U.S. PATENT DOCUMENTS

| | | | |
|---|---|---|---|
| 3,987,623 A | 10/1976 | Bianchetta | |
| 4,030,623 A | 6/1977 | Bridwell et al. | |
| 4,055,046 A * | 10/1977 | Schexnayder | 60/428 |
| 4,073,141 A | 2/1978 | Lohbauer | |
| 4,759,183 A * | 7/1988 | Kreth et al. | 60/422 |

OTHER PUBLICATIONS

International Search Report from corresponding International Application PCT/SE2005/000998.

* cited by examiner

*Primary Examiner*—Michael Leslie
(74) *Attorney, Agent, or Firm*—WRB-IP LLP

(57) ABSTRACT

A hydraulic system includes a first pump that delivers hydraulic fluid to a first load outlet point and to a second load outlet point, a second pump that delivers hydraulic fluid to the second load outlet point, but not to the first load outlet point, a pressure detector for detecting the load pressure at the first load outlet point and a pressure detector for detecting the load pressure at the second load outlet point. The system includes a controller for controlling the first pump on the basis of the detected load pressure at the first load outlet point and the detected load pressure at the second load outlet point, and a controller for controlling the second pump on the basis of the detected load pressure at the second load outlet point but not on the basis of the detected load pressure at the first load outlet point.

18 Claims, 2 Drawing Sheets

HYDRAULIC SYSTEM AND WORK MACHINE COMPRISING SUCH A SYSTEM

BACKGROUND AND SUMMARY

The present invention relates to a hydraulic system comprising a first pump that delivers hydraulic fluid to a first load outlet point and to a second load outlet point, a second pump that delivers hydraulic fluid to the second load outlet point, but not to the first load outlet point, means for detecting the load pressure at the first load outlet point and means for detecting the load pressure at the second load outlet point.

The invention also relates to a work machine provided with a hydraulic system according to the invention.

The invention is generally applicable for all machines that comprise at least two pumps, where each of the pumps is arranged to deliver hydraulic fluid to a common load outlet point, but where only one of the pumps delivers hydraulic fluid to an additional load outlet point.

It should be noted that a load outlet point can, in turn, comprise a plurality of load outlet points.

In work machines of the loader type designed according to previously-known technology, there are hydraulic systems with a pump that delivers hydraulic fluid for both the steering of the work machine and for one or more work functions, such as raising and lowering of a lifting unit, for example a bucket, and also a pump that only delivers hydraulic fluid for the said work functions. The output of the first pump, or rather the pressure that it is to provide, is controlled on the basis of signals relating to the detected load for the steering function and on the basis of signals relating to the detected work load, that is the load associated with the said work function or functions. In addition, the system comprises a priority valve that ensures that the flow from the first pump to the steering function is given priority over the flow to the work function or functions.

The output of the second pump, or more specifically the pressure that it is to provide, is also controlled on the basis of signals relating to the detected load for the steering function and the detected work load.

It is desirable to provide a hydraulic system that makes it possible to minimize the power that the hydraulic system requires, at least in certain operating situations, in a work machine or the like that is provided with such a hydraulic system, in order in this way to make as large a part as possible of the output that is taken momentarily from the motor of the work machine available for other functions than those that the hydraulic system requires.

An example of such another function is the propulsion of a work machine. The smaller the power that is required for driving the hydraulic system's pumps at a given moment, the greater the power that can be utilized, for example, for increasing the speed of the motor of the work machine, which can be required, for example, for rapid acceleration of the work machine.

According to an aspect of the present invention, a hydraulic system comprises means for controlling the first pump on the basis of the detected load pressure at the first load outlet point and the detected load pressure at the second load outlet point, and means for controlling the second pump on the basis of the detected load pressure at the second load outlet point, but not on the basis of the detected load pressure at the first load outlet point.

According to another aspect of the present invention, a work machine is provided with a hydraulic system according to the invention.

The first load outlet point is typically associated with the steering function of the work machine, while the second load outlet point is associated with one of the work machine's work functions.

The work machine has preferably a lifting unit, and accordingly the work function is a raising, lowering or tilting function of the lifting unit.

Further advantages and characteristics of the invention will be apparent from the following detailed description.

BRIEF DESCRIPTION OF DRAWINGS

A preferred embodiment of the invention will be described below for the purpose of exemplification with reference to the attached drawings, in which.

DETAILED DESCRIPTION

Figure 1:
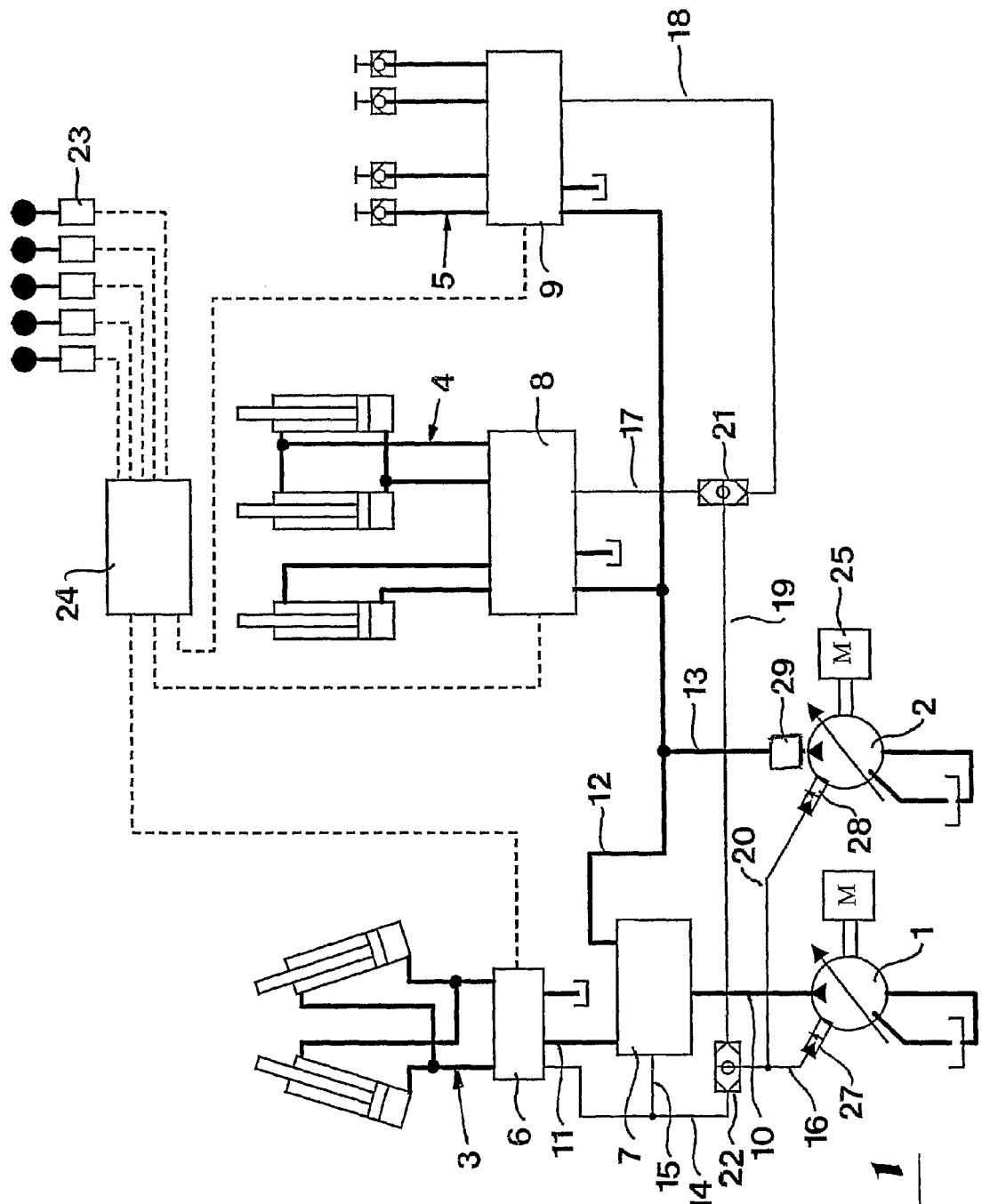
FIG. 1 is a schematic diagram showing the connections for a hydraulic system according to previously-known technology.

FIG. 1 is a schematic diagram showing the connections for a hydraulic system according to previously-known technology. The system is typically arranged in a work machine of the mobile loader type and is used partly for driving a steering function in the machine and partly for various work functions, such as raising, lowering and tilting of a lifting unit belonging to the work machine.

The hydraulic system shown in FIG. 1 comprises a first pump 1, a second pump 2, a first load outlet point indicated in general by 3, a second load outlet point indicated in general by 4, a third load outlet point indicated in general by 5, a first regulating valve 6 arranged at the first load outlet point, a priority valve 7, a second regulating valve 8 arranged at the second load outlet point and a plurality of third regulating valves 9 arranged at the third load outlet point 5.

A first pipe 10 runs from the first pump 1 to the priority valve 7. A second pipe 11 runs from the priority valve 7 to the first load outlet point 3 and a third pipe 12 runs from the priority valve 7 to the second and third load outlet points 4, 5. The priority valve 7 distributes the flow of hydraulic fluid from the first pipe 10 to the second and third pipes 11, 12. A fourth pipe 13 runs from the second pump 2 to the third pipe 12 and via this to the second and third load outlet points 4, 5. At each of the load outlet points 3, 4, 5, means (not shown in detail) are arranged to detect the pressure generated by the load at these points, i.e., pressure detectors. The system also comprises means in the form of pipes or leads 14-20 for transmitting the detected pressures to the pumps 1, 2 for control of the pumps on the basis of these values. The pressure-detecting means can be pressure sensors that give rise to an electrical signal that is sent via the said leads, or can consist of a purely hydraulic solution, in which the transmission of the detected pressures is carried out hydraulically in the said pipes 14-20. The load pressures from the second and third load outlet points are transmitted via the pipes or leads 17, 18 to a device 21 in which they are received as input data. The input data that relates to the highest load pressure is then forwarded as or determines the output data that is supplied from the said device 21 to an additional corresponding device 22, in which it constitutes input data together with the load pressure that is transmitted from the first load outlet point 3 via the pipe or lead 14. The input data that relates to the highest load pressure then forms or determines the output data from the said device 22 that is supplied to the pumps 1 and 2 via the pipes or leads 16 and 20 for controlling the pumps. The signals that relate to highest load pressure, or pump pressure requirement, out of the said hydraulic load signals from the first load outlet point and from the second and third load outlet points, will determine which pressure the respective pump is to provide.

The detected pressure at the first load outlet point 1 is also transmitted via a pipe or lead 15 to the priority valve 7 to control this on the basis of this value. For example, the priority valve 7 can be arranged to ensure that the first load outlet point always has its requirement of hydraulic fluid met, regardless of the requirement of the other load outlet points. This is the case, for example, in the example given of a mobile work machine in which the load outlet point is associated with the steering function of the machine.

In addition, the system comprises in a known way a number of controls 23, here in the form of levers, suitable for being operated manually by a driver. The controls 23 are operatively connected, either by wireless means or, as shown here, via leads, to a programmable control unit or computer 24 which is, in turn, operatively connected to the first regulating valve 6, the second regulating valve 8 and the third regulating valve 9 for control of these on the basis of the movement of the controls 23. It should be recognised that the controls can alternatively act as a hydraulic pilot, whereby hydraulic signals emanate from a valve where the lever is located and the size of the movement of the lever then determines the size of the hydraulic signal to which this gives rise.

FIG. 1 also shows that the pumps 1, 2 are each driven by a motor 25, that can be driven by or can consist of the motor that is also used for the actual propulsion of a work machine in which the hydraulic system is arranged.

Figure 2:
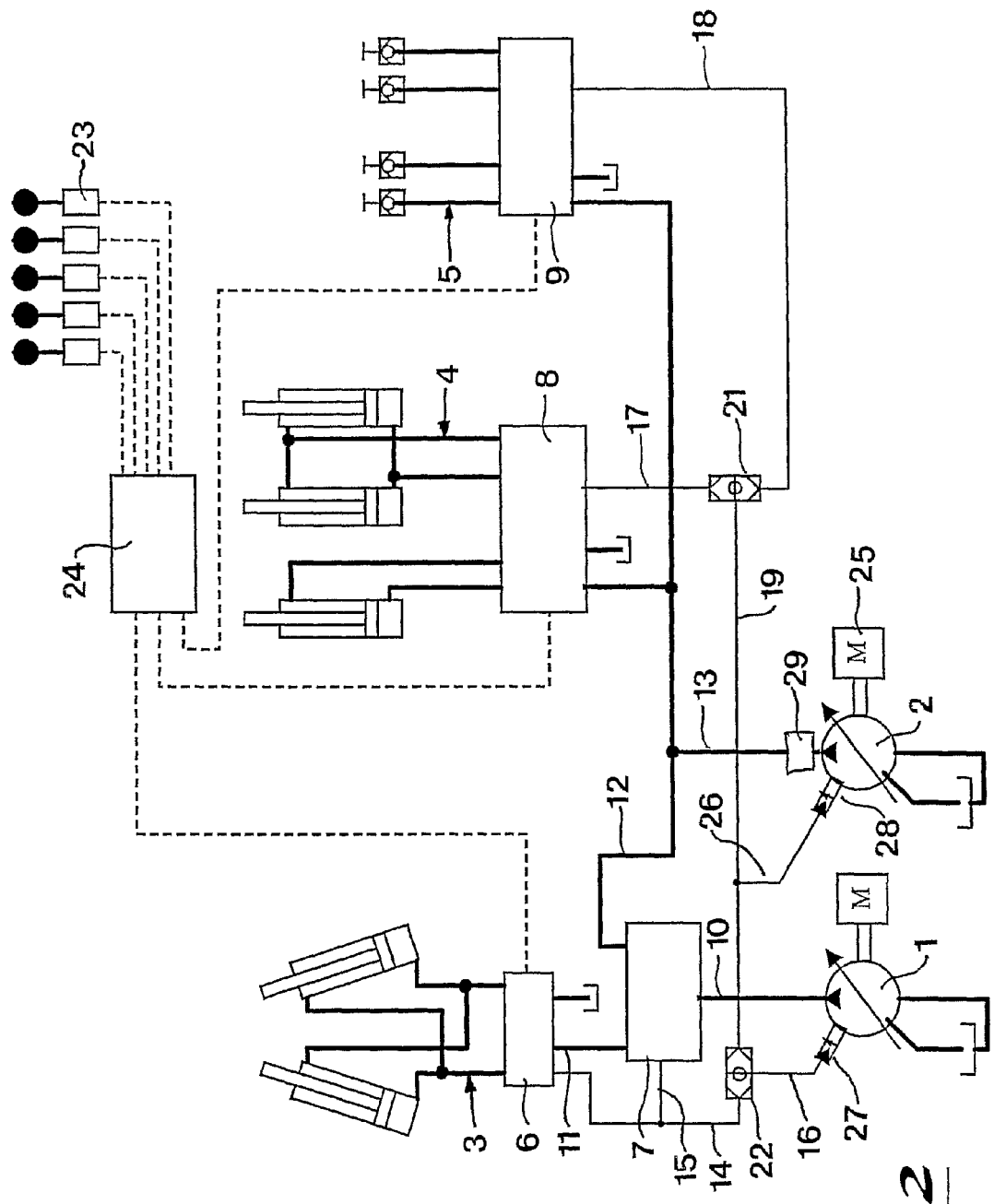
FIG. 2 is a schematic diagram showing the connections for a hydraulic system according to the invention.

FIG. 2 shows a hydraulic system according to an embodiment of the present invention. Identical components to those that are described for the system above according to previously-known technology have been given the same reference numerals as these. The difference in relation to the system described above according to previously-known technology is that the second pump 2 is only controlled on the basis of the load pressures at the second and third load outlet points 4, 5, that is only the load pressures at the points to which the second pump 2 delivers hydraulic fluid. Consequently, the pipe or lead 20 that was incorporated in the system according to previously-known technology is replaced by a pipe or lead 26 which, in this case, is a branch of the previously described pipe or lead 19 and transmits the same pressure information as this.

Each pump has a regulator 27 and 28 respectively, which receives the said load pressure signals and controls the setting of the respective pump on the basis of these signals, that is controls the pressure that the pump is to deliver.

According to the invention, the hydraulic system is arranged in a mobile work machine of the excavator or loader type, not shown, in which the first load outlet point 3 corresponds to the steering function of the work machine, the second load outlet point 4 corresponds to the raising, lowering and tilting function of a lifting unit on the work machine and the third load outlet point 6 corresponds to any additional work functions of the work machine.

In addition, there is a non-return valve 29 arranged on the second pump 2, more specifically in the third pipe 13, to avoid a flow of hydraulic fluid backwards towards the second pump 2 in the event of the pressure from the first pump 1 being so great that it could possibly generate such a flow. Such a non-return valve 29 is already known through the system according to previously-known technology.

The first and second pumps 1, 2 have different control pressures, that is the control pressures (or minimum pressures) that they are preset to deliver, even in the absence of an immediate need for pressure at the load outlet points. The first pump 1 has a control pressure that is higher than that of the second pump 2. As the first pump 1 receives load pressure signals from both the first load outlet point 3 and the load outlet points from which the second pump 2 receives load pressure signals, the system never demands a smaller pressure from the first pump 1 than from the second pump 2. The difference will be at least equal to the difference in the preset control pressures. In this way, a back flow through the first pump back to the tank is avoided.

As a result of the invention, an unnecessarily high output from the second pump is avoided under certain given operating conditions. In particular, the system is intended to function in the way that is defined by the invention so that the work machine's motor, that is used both for driving the hydraulic system and for propulsion of the work machine, runs at a low speed while the steering function is activated and lowering of the lifting unit is carried out. In just such a situation, in a system according to previously-known technology, the second pump 2 would be caused to deliver an unnecessarily high pressure, which would consequently require an unnecessarily high output from the motor and in this way, for example, delay an increase in the speed of the motor or even cause it to stall due to too sudden a demand for power.

It should be recognised that alternative embodiments will be apparent to an expert within the field within the concept of the invention as this is defined in the attached patent claims and in the description and the attached drawings.

For example, it would be possible to have a hydraulic system that, under certain operating conditions, works according to the load signal principle as described by previously-known technology and that changes under certain operating conditions to working according to the load signal principle according to the invention, that is with separate pressure load signals for the first and the second pumps, with the second pump only receiving pressure load signals from the load outlet points to which it is intended to deliver hydraulic fluid, which is expressed in the present application as the hydraulic system comprising means, i.e., a control arrangement, for controlling the second pump on the basis of the detected load pressure at the second load outlet point, but not on the basis of the detected load pressure at the first load outlet point.

It should also be recognised that, under certain operating conditions, it can be possible for the second pump to be able to deliver a small amount of hydraulic fluid also to the first load outlet point, but that it is still primarily intended to deliver hydraulic fluid to other load outlet points and not to the first load outlet point, which is primarily intended to be provided with hydraulic fluid from the first pump.

The invention claimed is:

1. A hydraulic system, comprising
    a first pump that delivers hydraulic fluid to a first load outlet point and to a second load outlet point,
    a second pump that delivers hydraulic fluid to the second load outlet point but not to the first load outlet point,
    a pressure detector for detecting load pressure at the first load outlet point,
    a pressure detector for detecting load pressure at the second load outlet point,
    a control arrangement for controlling the first pump based on a detected load pressure at the first load outlet point and the detected load pressure at the second load outlet point, and a control arrangement for controlling the second pump based on a detected load pressure at the second load outlet point but not based on the detected load pressure at the first load outlet point.

2. The hydraulic system as claimed in claim 1, comprising a non-return valve arranged on the second pump, with the non-return valve being arranged to prevent a flow in the direction towards the second pump and through this to the tank.

3. The hydraulic system as claimed in claim 1, comprising a priority valve that controls flow of hydraulic fluid from the first pump to the first load outlet point and the second load outlet point, with the priority valve being arranged to prioritize the flow to the first load outlet point.

4. The hydraulic system as claimed in claim 1, wherein the first pump has a higher control pressure than the second pump.

5. A work machine, comprising a hydraulic system as claimed in claim 1.

6. A work machine as claimed in claim 5, wherein the first load outlet point is associated with a steering function of the work machine.

7. The work machine as claimed in claim 5, wherein the second load outlet point is associated with a work function of the work machine.

8. The work machine as claimed in claim 7, wherein the working machine has a lifting unit and the work function is a raising, lowering or tilting function of the lifting unit.

9. The work machine as claimed in claim 5, comprising a motor for propulsion of the work machine and for driving the hydraulic system.

10. The work machine as claimed in claim 6, wherein the second load outlet point is associated with a work function of the work machine.

11. The work machine as claimed in claim 10, wherein the working machine has a lifting unit and the work function is a raising, lowering or tilting function of the lifting unit.

12. The work machine as claimed in claim 6, comprising a motor for propulsion of the work machine and for driving the hydraulic system.

13. The hydraulic system as claimed in claim 2, comprising a priority valve that controls the flow of hydraulic fluid from the first pump to the first load outlet point and the second load outlet point, with the priority valve being arranged to prioritize the flow to the first load outlet point.

14. The hydraulic system as claimed in claim 13, wherein the first pump has a higher control pressure than the second pump.

15. The hydraulic system as claimed in claim 3, wherein the first pump has a higher control pressure than the second pump.

16. A work machine, comprising a hydraulic system as claimed in claim 2.

17. A work machine, comprising a hydraulic system as claimed in claim 3.

18. A work machine, comprising a hydraulic system as claimed in claim 4.

* * * * *